US007951610B2

(12) United States Patent
Sawayashiki et al.

(10) Patent No.: US 7,951,610 B2
(45) Date of Patent: May 31, 2011

(54) REACTION METHOD AND REACTION APPARATUS

(75) Inventors: Yoshihiro Sawayashiki, Minami-Ashigara (JP); Hideyuki Karaki, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/568,336

(22) Filed: Sep. 28, 2009

(65) Prior Publication Data

US 2010/0081210 A1 Apr. 1, 2010

(30) Foreign Application Priority Data

Sep. 29, 2008 (JP) ............................... P2008-251875

(51) Int. Cl.
*G01N 1/22* (2006.01)

(52) U.S. Cl. .......... 436/180; 436/178; 436/52; 422/100; 422/101; 422/58; 422/68.1

(58) Field of Classification Search .................. 422/100; 436/180
See application file for complete search history.

(56) References Cited

U.S. PATENT DOCUMENTS 5,147,607 A 9/1992 Mochida
5,230,866 A 7/1993 Shartle et al.
2004/0096358 A1 5/2004 Blankenstein et al.
2004/0184964 A1 9/2004 Watanabe et al.
2005/0142624 A1 6/2005 Kitamori et al.
2006/0121624 A1* 6/2006 Huang et al. .................. 436/180
2007/0202557 A1 8/2007 Kitamori et al.
2009/0233378 A1* 9/2009 Nakajima et al. ............. 436/174

FOREIGN PATENT DOCUMENTS

EP 1 203 959 A1 5/2002
JP 2006-337221 A 12/2006
JP 2007-83191 A 4/2007
WO WO-03/06283 A1 7/2003
WO WO-2007/122850 A1 11/2007

* cited by examiner

*Primary Examiner* — Yelena G Gakh
*Assistant Examiner* — Christopher A Hixson
(74) *Attorney, Agent, or Firm* — Birch, Stewart, Kolasch & Birch, LLP

(57) ABSTRACT

A reaction method of performing an adsorption reaction in which a subject substance of analysis is specifically adsorbed in a first channel, the method includes: flowing a specimen liquid to a second channel connected to the first channel so that the specimen liquid is fed to the first channel, the specimen liquid containing the subject substance and a labeled substance that can be bonded to the subject substance; stopping feeding of the specimen liquid by detecting an event that a rear end of the specimen liquid flows into the first channel; joining a washing liquid to the rear end of the specimen liquid which stops in the first channel by flowing the washing liquid to a third channel that is converged to a connection portion of the second channel; and feeding the washing liquid to the first channel after the washing liquid is joined to the rear end.

3 Claims, 10 Drawing Sheets

FIG. 8

| | MANUAL OPERATION | SENSOR | SV1 | SV2 | SV3 | SV4 | PUMP | PT1 | PT2 | PT3 |
|---|---|---|---|---|---|---|---|---|---|---|
| | ※1 | | OFF | OFF | OFF | OFF | | ATMOSPHERE | ATMOSPHERE | ATMOSPHERE |
| V1-1 | START SW | | | | | | | | | |
| | | | ON | OFF | OFF | ON | 60 μL/min REDUCED PRESSURE | P (REDUCED PRESSURE) | ATMOSPHERE | CLOSED |
| V1-2 | | PH1=ON | | | | | | | | |
| | | | OFF | OFF | OFF | ON | 60 μL/min REDUCED PRESSURE | ATMOSPHERE | ATMOSPHERE | CLOSED |
| V1-3 | | Timer 0.5s | | | | | | | | |
| | | | ON | OFF | OFF | ON | 8 μL/min REDUCED PRESSURE | P (REDUCED PRESSURE) | ATMOSPHERE | CLOSED |
| V1-4 | | P -0.3kPa | | | | | | | | |
| | | | ON | ON | OFF | OFF | 60 μL/min REDUCED PRESSURE | P (REDUCED PRESSURE) | P (REDUCED PRESSURE) | ATMOSPHERE |
| V1-5 | | PH2=ON | | | | | | | | |
| | | | ON | ON | OFF | OFF | 60 μL/min REDUCED PRESSURE | P (REDUCED PRESSURE) | P (REDUCED PRESSURE) | ATMOSPHERE |
| V1-6 | | Timer 3s | | | | | | | | |
| | | | ON | OFF | ON | OFF | 8 μL/min REDUCED PRESSURE | P (REDUCED PRESSURE) | CLOSED | ATMOSPHERE |
| V1-7 | | PH3=ON | | | | | | | | |
| | | | OFF | OFF | OFF | OFF | STOP | ATMOSPHERE | ATMOSPHERE | ATMOSPHERE |

※1··· A MICROFLUID CHIP IN WHICH A SPECIMEN LIQUID IS FED TO A SECOND PORT PT2 AND A WASHING LIQUID IS FED TO A THIRD PORT PT3 IS SET TO THE TEST APPARATUS.

REACTION METHOD AND REACTION APPARATUS

BACKGROUND OF THE INVENTION

1. Field of the Invention

The present invention relates to a reaction method and a reaction apparatus for conducting an adsorption reaction that adsorbs specifically a subject substance of analysis.

2. Description of the Related Art

With the progress of molecular biology in recent years, such an approach is indicated that individual differences in effectiveness and a side effect of drug dosing in the disease treatment due to the constitution of individual can be predicted by analyzing a biological substance such as a blood, or the like. Such a tendency is rising that the optimum remedy for individuals should be applied by utilizing such approach.

For example, when it is known in advance that the effectiveness and the side effect of the particular therapeutic drug are correlated strongly with the particular gene, a base sequence of the patient's gene must be known to utilize this information in the treatment of the particular patient. The genetic diagnosis for getting the information about mutation of the endogenous gene or single nucleotide polymorphism (SNP) can be executed by amplifying and detecting a target nucleic acid containing such mutation or single nucleotide polymorphism. Therefore, a simple method capable of amplifying and detecting a target nucleic acid in a sample quickly and precisely is demanded.

In this case, while using either a protein such as an antibody, an antigen, or the like, which adsorbs specifically the subject substance of analysis, or a single-strand nucleic acid as a probe, an antigen-antibody reaction or a hybridization of nucleic acid is applied to the subject substance of analysis. For this purpose, a labeled substance having a high detecting sensitivity such as an enzyme and supporting the above protein, the nucleic acid, or the like that binds specifically to the subject substance of analysis is bonded previously to the subject substance of analysis. Then, the subject substance of analysis is detected and quantitated by detecting and determining quantitatively this labeled substance.

As the technology of this type, the technology to perform the antigen-antibody reaction and the washing operation in a single channel while injecting sequentially plural liquids into the single channel is already known (see International Publication 03/062823 Pamphlet, JP-A-2006-337221, for example). Also, the technology to prevent air bubbles from intervening between the liquids during the process of injecting sequentially plural liquids into a single channel is already known (see JP-A-2007-83191, for example). In the technology disclosed in JP-A-2007-83191, the hydrophobic channel is provided, the air vent hole and the water-repellant valve are provided to the channel, and the air located between the liquids is exhausted by pressure-feeding the liquid.

SUMMARY OF THE INVENTION

In the technology disclosed in International Publication 03/062823 Pamphlet and JP-A-2006-337221, such a risk exists that the air bubbles intervene between the liquids that are injected sequentially. When the air bubbles intervene, the liquid is propagated only along one side of the channel, and an uneven flow of the liquid is readily caused. Thus, the liquid feeding becomes unstable. Also, when the air bubbles are mixed, a gas-liquid interface is produced at the rear end of the liquid that flows precedingly. When the gas-liquid interface passes through the reaction portion in the channel, the nonspecific adsorption is easily caused.

Here, the "nonspecific adsorption" denotes that a substance is adsorbed onto a molecule that does not essentially interact with the substance. For example, the nonspecific adsorption denotes such an event that, in the antigen-antibody reaction in which the antigen acting as the subject substance of analysis should be adsorbed specifically by using the antibody that is fixed to the reaction portion and then such antigen should be detected and quantitated by detecting and quantitatively determining a labeled substance that is bonded to the adsorbed antigen, the labeled substance is solely adsorbed onto the reaction portion.

In the technology disclosed in JP-A-2007-83191, since the channel is hydrophobic and the antibody that is supported on the labeled substance to bind the labeled substance with the antigen is ready to adhere to the hydrophobic surface, the nonspecific adsorption of the labeled substance is increased, and thus it is feared that a detection/quantitative determination accuracy of the subject substance of analysis is lowered due to such increase.

The present invention has been made in view of the above circumstances, and it is an object of the present invention to provide a reaction method and a reaction apparatus capable of enhancing a detection/quantitative determination accuracy of a subject substance of analysis by preventing air bubbles from mixing.

(1) A reaction method of performing an adsorption reaction in which a subject substance of analysis is specifically adsorbed in a first channel, the method includes:

flowing a specimen liquid to a second channel that is connected to the first channel so that the specimen liquid is fed to the first channel from the second channel, the specimen liquid containing the subject substance of analysis and a labeled substance that can be bonded to the subject substance of analysis;

stopping feeding of the specimen liquid by detecting an event that a rear end of the specimen liquid flows into the first channel;

joining a washing liquid to the rear end of the specimen liquid which stops in the first channel by flowing the washing liquid to a third channel that is converged to a connection portion of the second channel connected to the first channel; and feeding the washing liquid to the first channel from the third channel after the washing liquid is joined to the rear end of the specimen liquid.

According to the above reaction method, the feeding of the specimen liquid is stopped after the rear end of the specimen liquid flowing through the second channel flows into the first channel, and then the washing liquid is joined to the rear end of the specimen liquid that stops in the first channel, by flowing the washing liquid through the third channel that is different from the second channel and is converged to the connection portion of the second channel connected to the first channel. Therefore, no bubble is interposed between the specimen liquid and the washing liquid. As a result, the liquid feeding can be stabilized, and also the nonspecific adsorption in the first channel can be suppressed.

(2) The reaction method as described in (1) above, wherein a narrowed section is provided in the first channel, the narrowed section being continued from the connection portion of the first channel to the second channel, a sectional area a of the narrowed section is set smaller than a sectional area A of the second channel, and the event that the rear end of the specimen liquid flows into the first channel is detected based on a change in internal pressure of the first channel.

According to the above reaction method, a capillary force working in the narrowed section whose sectional area is smaller than that of the second channel is larger than that of the second channel. Therefore, when the rear end of the specimen liquid flows into the narrowed section from the second channel, the specimen liquid stops there until an internal pressure of the first channel is reduced to overcome the capillary force in the narrowed section, and an internal pressure in the reaction channel is reduced gradually for this while. As a result, the event that the rear end of the specimen liquid flows into the first channel can be detected based on a change in internal pressure of the first channel, and the feeding of the specimen liquid can be stopped.

(3) The reaction method as described in (2) above, wherein the sectional area a of the narrowed section is ⅖ to 1/300 of the sectional area A of the second channel.

According to the above reaction method, the capillary force of the narrowed section is relatively larger than that of the second channel. Therefore, the event that the rear end of the specimen liquid flows into the first channel can be detected more surely.

(4) The reaction method as described in any one of (1) to (3) above, wherein an opening portion of the connection portion of the first channel connected to the second channel is formed in one surface of the second channel and located in a position that is away from an edge of the surface.

According to the above reaction method, the connection portion of the first channel can be filled with the liquid, while preventing that the liquid flows easily into the first channel along the edge. Therefore, the air bubbles can be eliminated more surely.

(5) A reaction apparatus, includes:

a microfluid chip that includes first to third channels and first to third ports provided to base end portions of the first to third channels respectively;

a liquid feeding unit that feeds a liquid to the first to third channels by applying a pressure to the first to third ports respectively; and a controlling unit that drives the liquid feeding unit, wherein the first channel and the second channel are connected each other at tip end portions of the first and second channels, the third channel is converged to a connection portion of the second channel connected to the first channel, the first channel executes an adsorption reaction in which a subject substance of analysis is specifically adsorbed, and the controlling unit feeds a specimen liquid flown in the second channel to the first channel, the specimen liquid containing the subject substance of analysis and a labeled substance that can be bonded to the subject substance of analysis, then stops feeding of the specimen liquid and joins a washing liquid flown in the third channel to a rear end of the specimen liquid which stops in the first channel by detecting an event that the rear end of the specimen liquid flows into the first channel, and then feeds the washing liquid to the first channel after the washing liquid is joined to the rear end of the specimen liquid.

According to the above reaction apparatus, the feeding of the specimen liquid is stopped after the rear end of the specimen liquid flowing through the second channel flows into the first channel, and then the washing liquid is joined to the rear end of the specimen liquid that stops in the first channel, by flowing the washing liquid through the third channel that is different from the second channel and is converged to the connection portion of the second channel connected to the first channel. Therefore, no bubble is interposed between the specimen liquid and the washing liquid. As a result, the liquid feeding can be stabilized, and also the nonspecific adsorption in the first channel can be suppressed.

(6) The reaction apparatus as described in (5) above, further includes:

a pressure measuring unit that measures a pressure that is applied to the first port, wherein the first channel has a narrowed section that is continued from the connection portion of the first channel to the second channel, a sectional area a of the narrowed section is set smaller than a sectional area A of the second channel, and the controlling unit detects the event that the rear end of the specimen liquid flows into the first channel, based on a measuring signal that is sent out from the pressure measuring unit.

According to the above reaction apparatus, the capillary force working in the narrowed section whose sectional area is smaller than that of the second channel is larger than that of the second channel. Therefore, when the rear end of the specimen liquid flows into the narrowed section from the second channel, the specimen liquid stops there until an internal pressure of the first channel is reduced to overcome the capillary force in the narrowed section, and an internal pressure in the reaction channel is reduced gradually for this while. As a result, the event that the rear end of the specimen liquid flows into the first channel can be detected based on a change in internal pressure of the first channel, and the feeding of the specimen liquid can be stopped.

(7) The reaction apparatus as described in (6) above, wherein the sectional area a of the narrowed section is ⅖ to 1/300 of the sectional area A of the second channel.

According to the above reaction apparatus, the capillary force of the narrowed section is relatively larger than that of the second channel. Therefore, the event that the rear end of the specimen liquid flows into the first channel can be detected more surely.

(8) The reaction apparatus as described in any one of (5) to (7) above, wherein an opening portion of the connection portion of the first channel connected to the second channel is formed in one surface of the second channel and located in a position that is away from an edge of the surface.

According to the above reaction apparatus, the connection portion of the first channel can be filled with the liquid, while preventing that the liquid flows easily into the first channel along the edge. Therefore, the air bubbles can be eliminated more surely.

BRIEF DESCRIPTION OF THE DRAWINGS

FIG. 8 represents a time chart showing control timings of the test sequence executed by the reaction apparatus in FIG. 4 and states of respective elements of the reaction apparatus along with a time base;

DETAILED DESCRIPTION OF THE INVENTION

A preferred exemplary embodiment of the present invention will be explained with reference to the drawings hereinafter.

Figure 1:
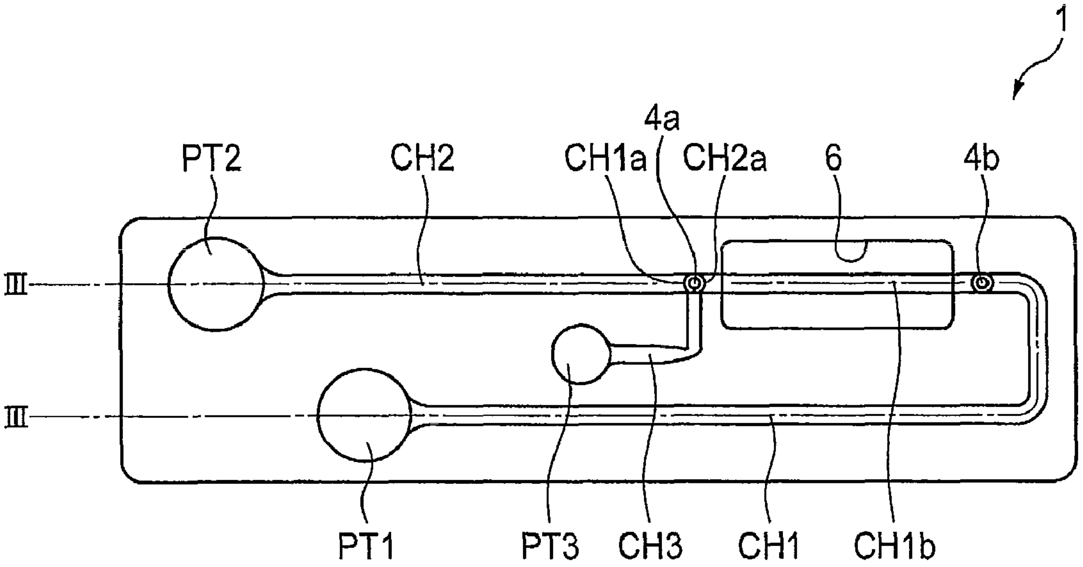
FIG. 1 represents a plan view of an example of a microfluid chip used to explain an exemplary embodiment of the present invention.
Figure 2:
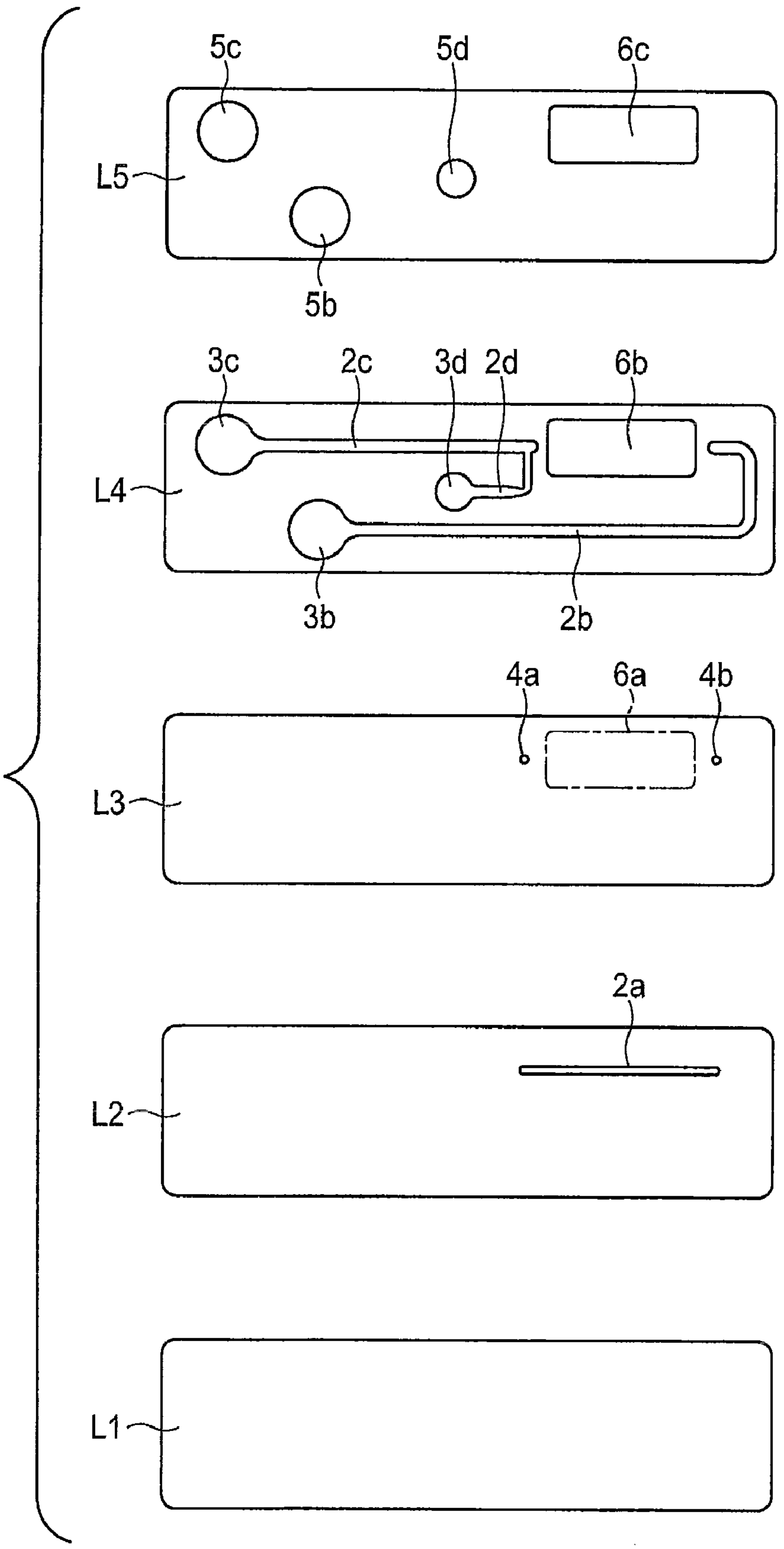
FIG. 2 represents a plan view showing the microfluid chip in FIG. 1 in a disassembled state.
Figure 3:
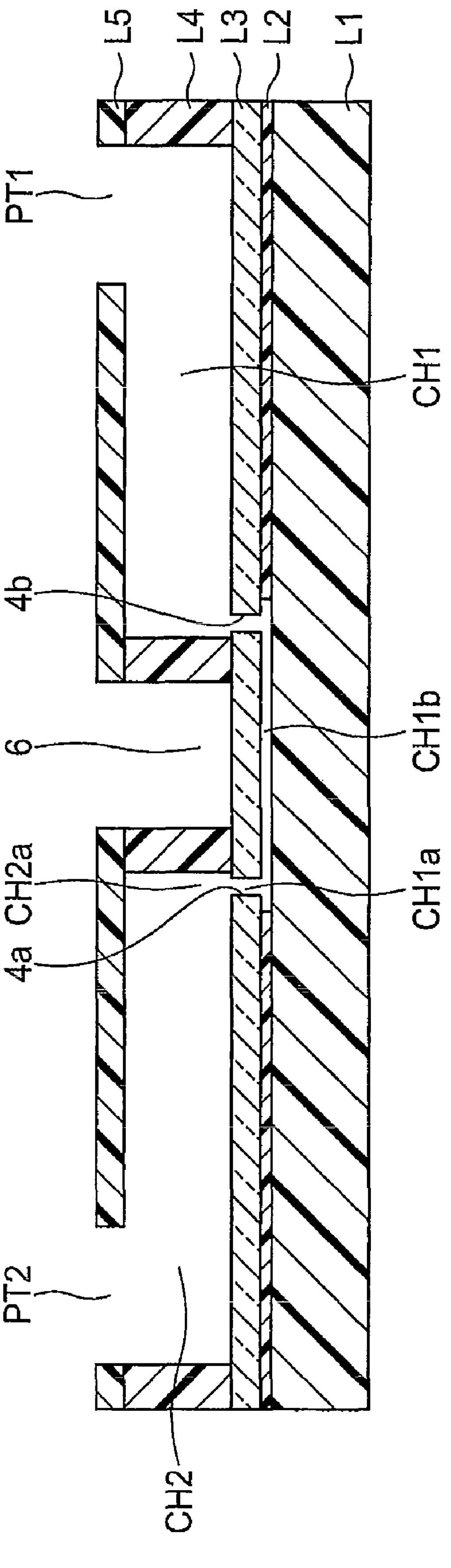
FIG. 3 represents a sectional view of the microfluid chip in FIG. 1, which is taken along a line.

FIG. 1 is a plan view of an example of a microfluid chip used to explain an exemplary embodiment of the present invention, FIG. 2 is a plan view showing the microfluid chip in FIG. 1 in a disassembled state, and FIG. 3 is a sectional view of the microfluid chip in FIG. 1, which is taken along a III-III line.

A microfluid chip 1 has a first channel CH1, a second channel CH2, and a third channel CH3 and also a first port PT1, a second port PT2, and a third port PT3 provided to base end portions of these channels CH1 to CH3 respectively. A pressure is applied to the ports PT1 to PT3 to control an internal pressure of the channels CH1 to CH3 respectively, and the liquid fed to the microfluid chip 1 is introduced into the ports PT1 to PT3, as occasion demands.

The first channel CH1 and the second channel CH2 are connected mutually at their tip end portions CH1*a*, CH2*a*. Also, the third channel CH3 is converged to the connection portion (tip end portion) CH2*a* of the second channel CH2 that is connected to the first channel CH1. The first channel CH1 provides a section that is continued from the connection portion (tip end portion) CH1*a* connected to the second channel CH2, and has a narrowed section CH1*b* whose sectional area a is smaller than a sectional area A of the second channel CH2.

An opening portion 4*a* of the connection portion CH1*a* is formed in a bottom surface of the connection portion CH2*a* of the second channel CH2, and is positioned away from an edge constituting the bottom surface (see FIG. 3). Since the opening portion 4*a* is formed away from the edge, such a situation can be prevented that the liquid flowing through the second channel CH2 propagates along the edge and flows easily into the narrowed section CH1*b*. Accordingly, first the connection portion CH2*a* of the second channel CH2 is filled with the liquid, and then the liquid flows into the narrowed section CH1*b*. Therefore, it can be prevented that air bubbles remain in the connection portion CH2*a* of the second channel CH2.

As shown in FIG. 2 and FIG. 3, the microfluid chip 1 has a stacked structure consisting of a plurality of layers L1 to L5. The first layer L1 is used as a substrate, and a groove 2*a* is formed in the second layer L2 stacked on the first layer L1, to pass through the layer. This groove 2*a* is used to constitute the narrowed section CH1*b* of the first channel CH1. The second layer L2 is put between the first layer L1 and the third layer L3 on both front and back sides, and the narrowed section CH1*b* is constructed in the position of the groove 2*a*.

A groove 2*b* constituting the first channel CH1 except the narrowed section CH1*b*, a groove 2*c* constituting the second channel CH2, and a groove 2*d* constituting the third channel CH3 are formed in the fourth layer L4 being stacked on the third layer L3 to pass through the layer respectively. The fourth layer L4 is put between the third layer L3 and the fifth layer L5 on both front and back sides, and thus the first channel CH1 except the narrowed section CH1*b*, the second channel CH2, the third channel CH3 are constructed in the positions of the grooves 2*b* to 2*d* respectively. Also, port holes 3*b* to 3*d* are formed in the fourth layer L4 at base end portions of the grooves 2*b* to 2*d* respectively to pass through the layer.

The through holes 4*a*, 4*b* are formed in the third layer L3 interposed between the second layer L2 and the fourth layer L4 to pass through the layer respectively. A tip end portion of the groove 2*c* in the fourth layer L4 (corresponding to the connection portion CH2*a* of the second channel CH2) overlaps vertically with one end portion of the groove 2*a* in the second layer L2 (corresponding to the connection portion CH1*a* of the first channel CH1), and the through hole 4*a* is arranged between them. Also, a tip end portion of the groove 2*b* in the fourth layer L4 overlaps vertically with the other end portion of the groove 2*a* in the second layer L2, and the through hole 4*b* is arranged between them. The through hole 4*a* constitutes an opening of the connection portion CH1*a* of the first channel CH1 connected to the second channel CH2. Also, the through hole 4*b* connects the narrowed section CH1*b* and the first channel CH1 except this section.

In the fifth layer L5 serving as the lid of the microfluid chip 1, port holes 5*b* to 5*d* are formed to pass through the layer respectively. The port holes 5*b* to 5*d* overlap with the port holes 3*b* to 3*d* in the fourth layer L4 to constitute the ports PT1 to PT3 respectively, and provide the connection to respective ports PT1 to PT3 from the outside.

The sectional area a of the narrowed section CH1*b* of the first channel CH1 is set smaller than the sectional area A of the second channel CH2, and these sectional areas are changed according to thicknesses of respective layers. For example, a width of the channel is set constant at 2 mm, a thickness of the fourth layer L4 in which the groove 2*c* used to constitute the second channel CH2 is formed is set to 0.5 to 3 mm, and a thickness of the second layer L2 in which the groove 2*a* used to constitute the narrowed section CH1*b* is set to 0.01 to 0.2 mm. The width of the narrowed section CH1*b* may be set smaller than the width of the second channel CH2, and thus the sectional area a of the narrowed section CH1*b* may be set smaller than the sectional area A of the second channel CH2. Preferably the sectional area a of the narrowed section CH1*b* should be set to $\frac{2}{5}$ to $\frac{1}{300}$ of the sectional area A of the second channel CH2.

The above layers L1 to L5 can be formed of a plate manufactured by a synthetic resin such as polystyrene, acrylic, or the like, for example. These layers are joined mutually by interposing adequately the adhesive material such as an adhesive double-coated sheet, or the like between the layers. For example, since the second layer L2, or the like has a relatively small thickness so as to constitute the narrowed section CH1*b* of the first channel CH1, such layer itself may be formed of the adhesive double-coated sheet. The grooves, the port holes, and the communication holes in respective layers are formed by the laser beam machining, for example.

In this case, a transparent window portion 6*a* is provided in a portion, which overlaps at least with the groove 2*a* in the second layer L2, in the third layer L3. Also, window holes 6*b*, 6*c* are formed in portions, which overlaps similarly with the groove 2*a* in the second layer L2, in the fourth layer L4 and the fifth layer L5. A detecting portion 6 is constructed by the window holes 6*b*, 6*c* and the window portion 6*a* in a state that the layers L1 to L5 are stacked sequentially. The narrowed section CH1*b* of the first channel CH1 can be viewed from the outside through this detecting portion 6.

Figure 4:
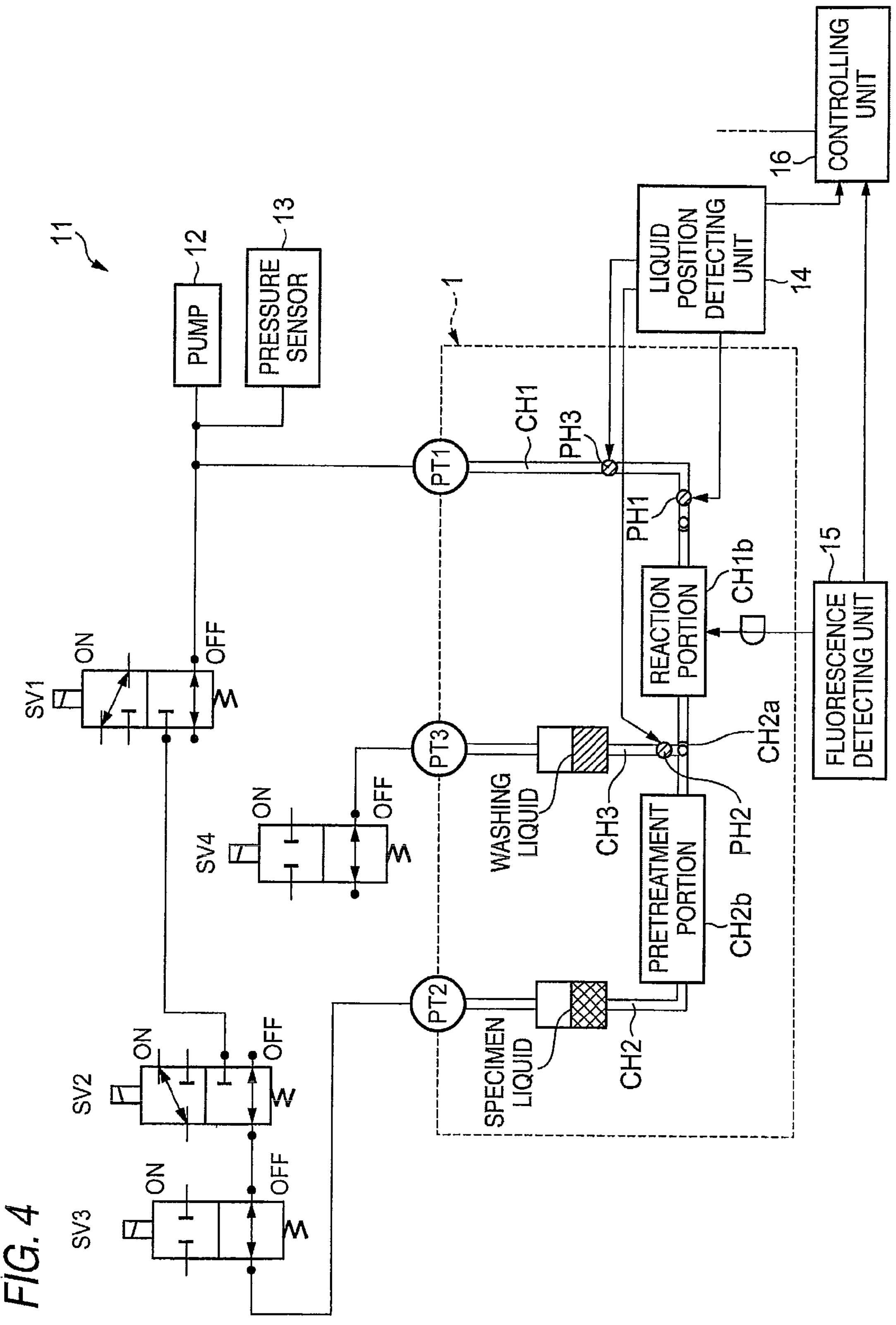
FIG. 4 represents a block diagram showing a schematic configuration of a reaction apparatus containing the microfluid chip in FIG. 1.

Next, an application example of the microfluid chip 1 will be explained hereunder. FIG. 4 is a block diagram showing a schematic configuration of a reaction apparatus containing the microfluid chip. In the application example of the microfluid chip explained hereunder, the specimen liquid containing the antigen as the subject substance of analysis is fed to the microfluid chip, and then such antigen is detected and quantitated by performing the antigen-antibody reaction in the channel of the microfluid chip.

As shown in FIG. 4, the specimen liquid (first liquid) containing the antigen is fed to the second port PT2 of the microfluid chip. Also, the washing liquid (second liquid) is fed to the third port PT3. The specimen liquid fed to the second port PT2 flows through the second channel CH2, and also the washing liquid fed to the third port PT3 flows through the third channel CH3. Then, these liquids are fed sequentially to the first channel CH1.

A pretreatment portion CH2*b*, to which a fluorescent fine particle serving as a labeled substance that is supporting the antibody to be bonded to the antigen is fixed, is provided to an intermediate portion of the second channel CH2. When the specimen liquid passes through the pretreatment portion CH2*b*, adhesion of the fluorescent fine particle to the pretreatment portion CH2*b* is released and then the fluorescent fine particle is bonded to the antigen contained in the specimen liquid. In this case, the specimen liquid may be fed to the second port PT2 in a state that the fluorescent fine particle is bonded in advance to the antigen contained in the specimen liquid.

The antibody acting as a probe, which specifically adsorbs the antigen contained in the specimen liquid, is fixed to the narrowed section CH1*b* of the first channel CH1 to which the specimen liquid and the washing liquid are fed sequentially. The narrowed section CH1*b* of the first channel CH1 serves as the reaction portion that performs the antigen-antibody reaction. In this case, the hydrophilicity is given at least to the surface of the narrowed section CH1*b* as the reaction portion by applying the appropriate surface treatment.

A reaction apparatus 11 is equipped with the microfluid chip 1, electromagnetic valves SV1 to SV4, a pump 12 that employs an air as a working fluid, a pressure sensor (pressure measuring unit) 13, a liquid position detecting unit 14, a fluorescence detecting unit 15, and a controlling unit 16.

The first port PT1 and the second port PT2 are connected in parallel to the pump 12 via port pads (not shown) and pipings respectively. The electromagnetic valves SV1 to SV3 are interposed in the piping that connects the pump 12 and the second port PT2. Also, the third port PT3 is connected to the electromagnetic valve SV4 via the port pad (not shown) and the piping.

The pressure sensor 13 is provided between the pump 12 and the first port PT1, and measures a pressure that works on the first port PT1, i.e., an internal pressure of the first channel CH1.

The liquid position detecting unit 14 detects that a front end of the specimen liquid or the washing liquid arrives at an appropriate position in the channels CH1 to CH3. As the detecting method, such a method can be illustrated that a light is irradiated onto a detecting position to detect a reflected light and then the presence or absence of the liquid is decided based upon a change in a quantity of light of the reflected light, which is caused by a change of a refractive index between the air and the liquid.

In the illustrated example, as the detecting position, a first detection position PH1 is provided to the position that is located on the slightly downstream side from the narrowed section CH1*b* of the first channel CH1 to the first port PT1. A second detection position PH2 is provided to the position of the third channel CH3 prior to a converging portion to the second channel CH2. Also, a third detection position PH3 is provided to the position of the first channel CH1 prior to the first port PT1.

The fluorescence detecting unit 15 irradiates an excitation light of a particular wavelength onto the narrowed section CH1*b* of the first channel CH1 as the reaction portion through the detecting portion 6 of the microfluid chip 1. The fluorescent fine particle, which is bonded to the antigen being adsorbed by the antigen-antibody reaction, absorbs the excitation light in the narrowed section CH1*b* and emits the fluorescence. The fluorescence detecting unit 15 detects the antigen by detecting this fluorescence, and quantitates the antigen based on a fluorescence intensity.

The controlling unit 16 has CPU, ROM that stores a test sequence, and the like. The controlling unit 16 receives a measured signal being sent out from the pressure sensor 13 and a detected signal being sent out from the liquid position detecting unit 14, and drives the pump 12 and the electromagnetic valves SV1 to SV4 at appropriate timings indicated based upon these signals such that a pressure is applied to the ports PT1 to PT3, a pressure in the ports PT1 to PT3 is reduced, the ports PT1 to PT3 are opened to the atmosphere, or the ports PT1 to PT3 are closed. Accordingly, the specimen liquid and the washing liquid can be carried freely through the channels CH1 to CH3.

Figure 5:
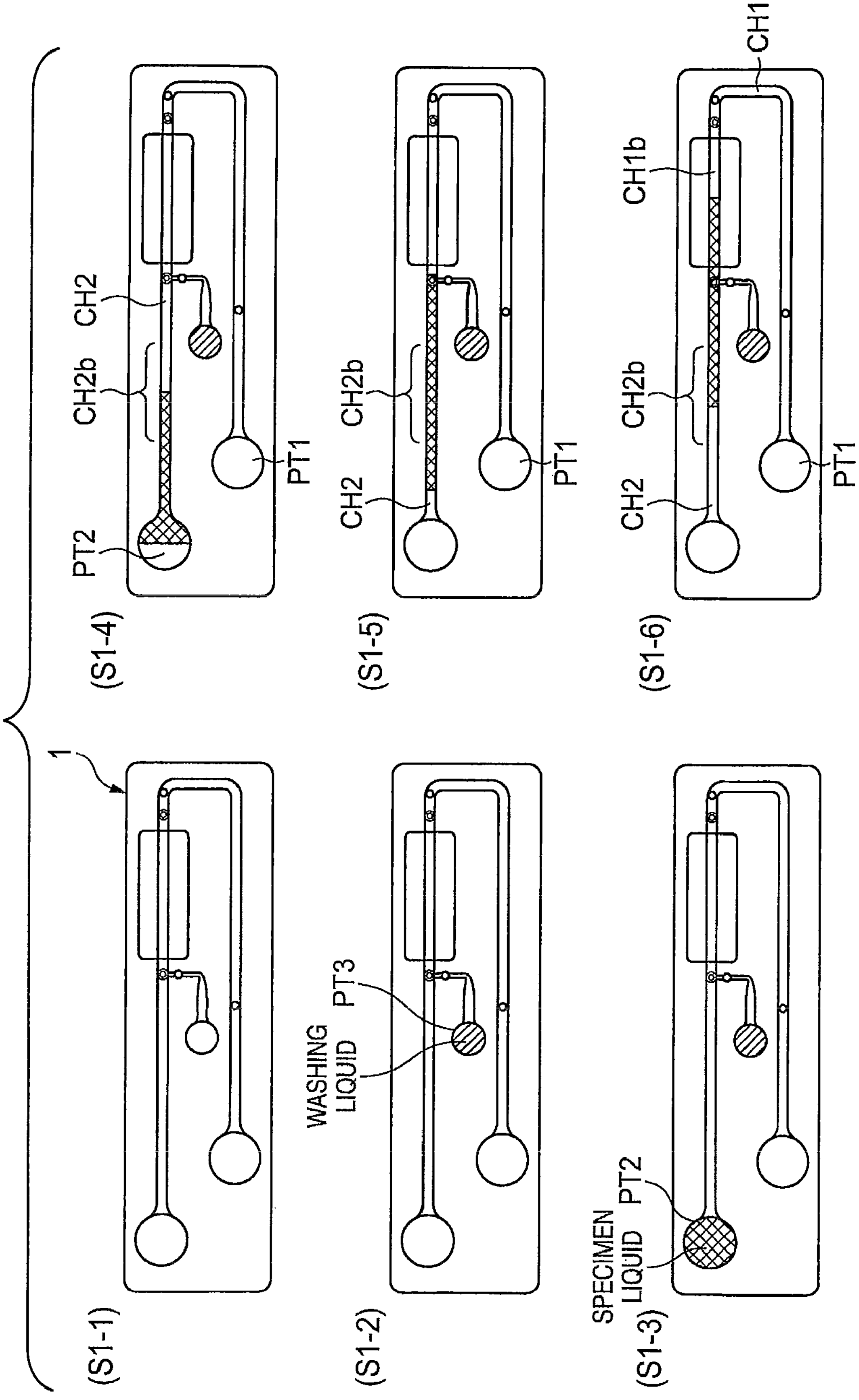
FIG. 5 represents a plan view showing states of the microfluid chip in respective steps of a test sequence executed by the reaction apparatus in FIG. 4.
Figure 6:
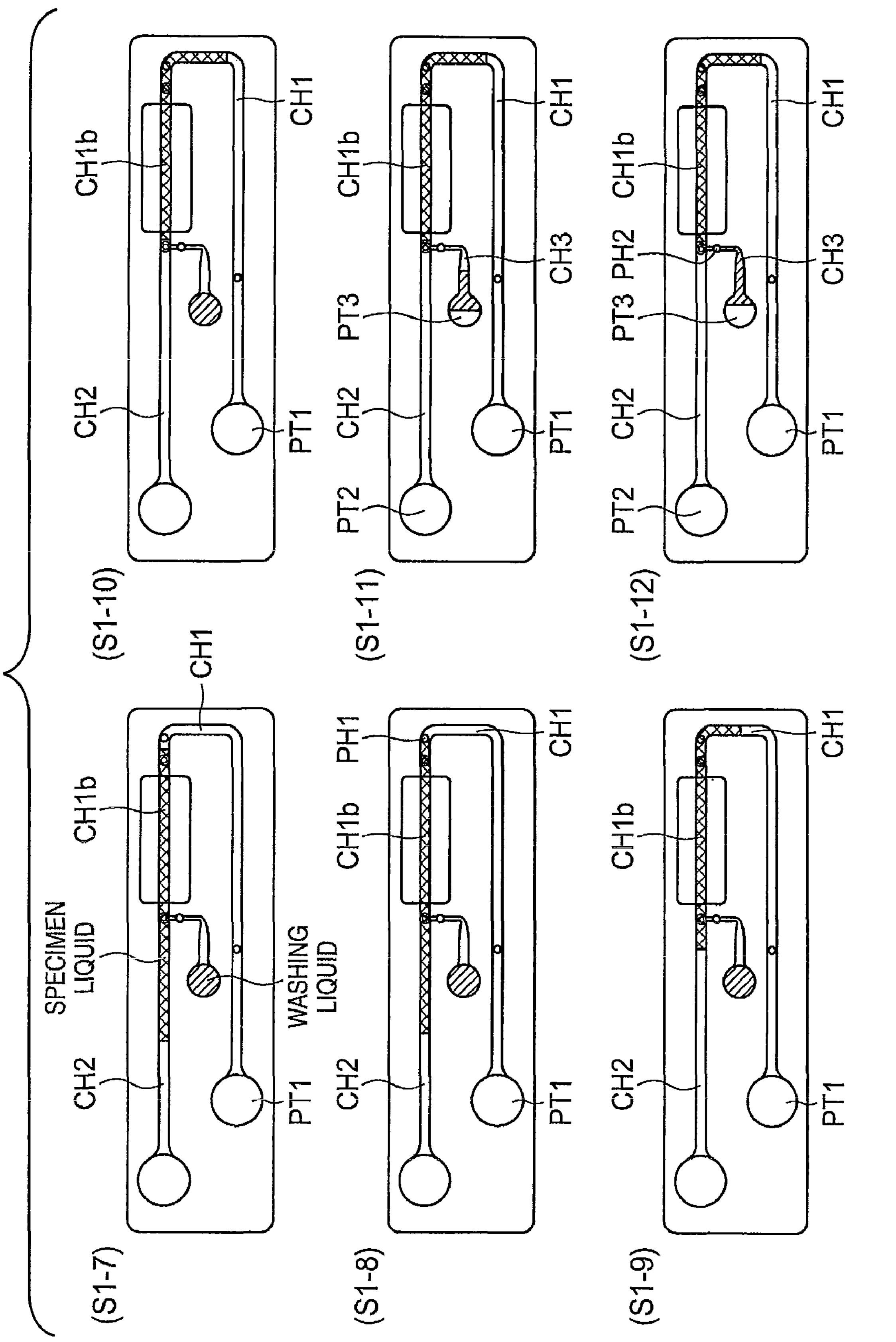
FIG. 6 represents a plan view showing states of the microfluid chip in respective steps of a test sequence executed by the reaction apparatus in FIG. 4.
Figure 7:
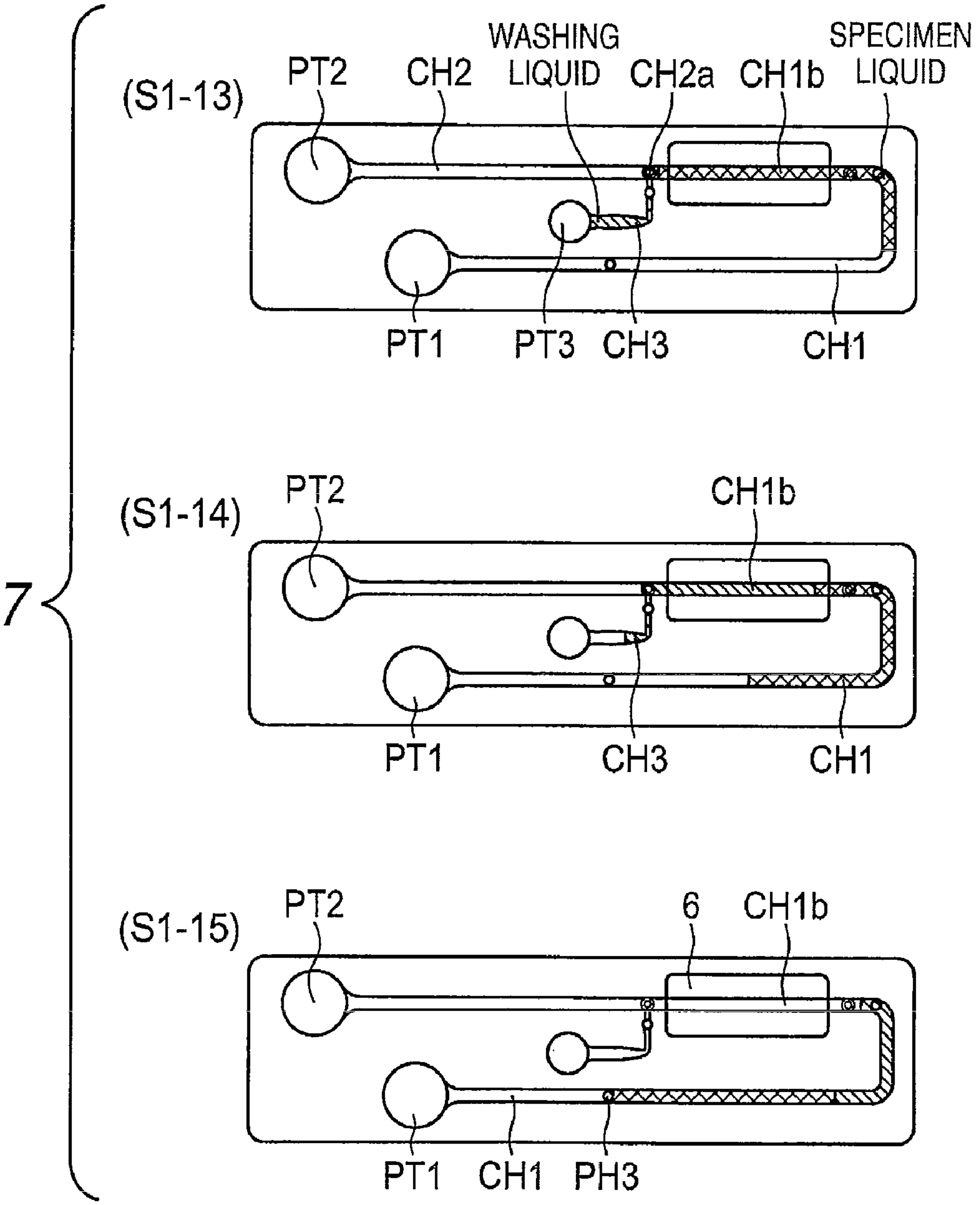
FIG. 7 represents a plan view showing states of the microfluid chip in respective steps of a test sequence executed by the reaction apparatus in FIG. 4.

Next, a test sequence using the above reaction apparatus 11 will be explained hereunder. FIG. 5 to FIG. 7 are plan views showing states of the microfluid chip in respective steps of the test sequence, and FIG. 8 is a time chart showing control timings of the test sequence and states of respective elements of the reaction apparatus along with a time base. Explanation will be made hereunder, while correlating control timings V1-1 to V1-7 in FIG. 8 with respective steps S1-1 to S1-15 in FIG. 5 to FIG. 7.

First, the microfluid chip 1 is prepared (S1-1). Then, the washing liquid is fed to the third port PT3 of the microfluid chip 1 (S1-2). Then, the specimen liquid is fed to the second port PT2 (S1-3).

The microfluid chip 1 is set to the reaction apparatus 11, and the port pad is pushed against the ports PT1 to PT3 respectively. At this time, respective port pads are opened to the atmosphere, and the specimen liquid and the washing liquid are never moved by pushing the pad.

When a start switch of the reaction apparatus 11 is pushed (V1-1), a pressure in the first port PT1 is reduced and then the specimen liquid flows from the second channel CH2 to the first channel CH1 at a high speed (e.g., 60 μL/min) (S1-4 to S1-7). When the specimen liquid passes through the pretreatment portion CH2*b* of the second channel CH2, the fluorescent fine particle in the pretreatment portion CH2*b* is bonded to the antigen contained in the specimen liquid.

When a front end of the specimen liquid arrives at the first detection position PH1 and the liquid position detecting unit 14 turns ON the first detection position PH1 (S1-8, V1-2), the first port PT1 is opened to the atmosphere and the specimen liquid stops in that position. According to this operation, the specimen liquid can be stopped in a predetermined position with good accuracy. At this time, the first detection position PH1 is set such that a rear end of the specimen liquid is located in the second channel CH2.

When a predetermined time (e.g., 0.5 second) has lapsed after the first port PT1 is opened to the atmosphere (V1-3), a pressure of the first port PT1 is reduced again, and the specimen liquid flows to the first channel CH1 at a low speed (e.g., 8 μL/min). Then, the antigen-antibody reaction is executed in the narrowed section CH1*b* as the reaction portion for a predetermined time (e.g., 5 minute) (S1-9).

When a rear end of the specimen liquid flows into the narrowed section CH1*b* of the first channel CH1, the specimen liquid stops automatically (S1-10). This is because the sectional area a of the narrowed section CH1*b* of the first channel CH1 is set smaller than the sectional area A of the second channel CH2 and thus a capillary force working in the narrowed section CH1*b* becomes larger than a carrying pressure. The pump 12 continues to suck without interruption, and a pressure in the first channel CH1 is reduced gradually. But the specimen liquid still stops until the carrying pressure becomes larger than the capillary force working in the narrowed section CH1*b*.

Therefore, it can be detected that the rear end of the specimen liquid flows into the narrowed section CH1*b* of the first channel CH1, by measuring a variation in an internal pressure of the first channel CH1 by means of the pressure sensor 13. Preferably the sectional area a of the narrowed section CH1*b* of the first channel CH1 should be set to ⅖ to 1/300 of the sectional area A of the second channel CH2. According to this, the capillary force of the narrowed section CH1*b* is sufficiently large in contrast to that of the second channel CH2, and thus an event that the rear end of the specimen liquid flows into the narrowed section CH1*b* can be detected more surely.

When an internal pressure of the first channel CH1 is reduced to a predetermined pressure (e.g., 0.3 kPa)(V1-4), it is decided that the rear end of the specimen liquid flows into the narrowed section CH1*b* of the first channel CH1. Then, the third port PT3 is opened to the atmosphere, and a pressure in the second port PT2 is reduced. Accordingly, the washing liquid contained in the third port PT3 flows to the third channel CH3 at a high speed (e.g., 60 μL/min) (S1-11). At this time, the inside of the first port PT1 and the second port PT2 is sucked by the pump 12 to have the same pressure, and the specimen liquid never flows backward from the first channel CH1 to the second port PT2.

A front end of the washing liquid arrives at the second detection position PH2 while the specimen liquid stops in the first channel CH1, the liquid position detecting unit 14 turns ON the second detection position PH2 (S1-12, V1-5). After a predetermined time (e.g., 3 second) has lapsed from this state (V1-6), the washing liquid arrives at the connection portion CH2*a* of the second channel CH2 to which the third channel CH3 is converged. Since the second channel CH2 is connected to the first channel CH1 at the connection portion CH2*a*, the washing liquid is joined to the rear end of the specimen liquid without intervention of the air bubbles (S1-13).

The second port PT2 is tightly closed, and only a pressure in the first port PT1 is reduced. The washing liquid flows to the narrowed section CH1*b* at a low speed (e.g., 8 μL/min) subsequently to the specimen liquid without intervention of the air bubbles, and the narrowed section CH1*b* as the reaction portion is washed (S1-14). Accordingly, the unreacted antigen and the fluorescent fine particle are exhausted from the narrowed section CH1*b*.

All the specimen liquid and the washing liquid flow downstream to pass through the narrowed section CH1*b* in the first channel CH1, and the front end of the liquid arrives at the third detection position PH3. Then, when the liquid position detecting unit 14 turns ON the third detection position PH3 (V1-7), the pump 12 stops and the liquids stop (S1-15). Also, the first port PT1 and the second port PT2 are opened to the atmosphere.

Figure 9A:
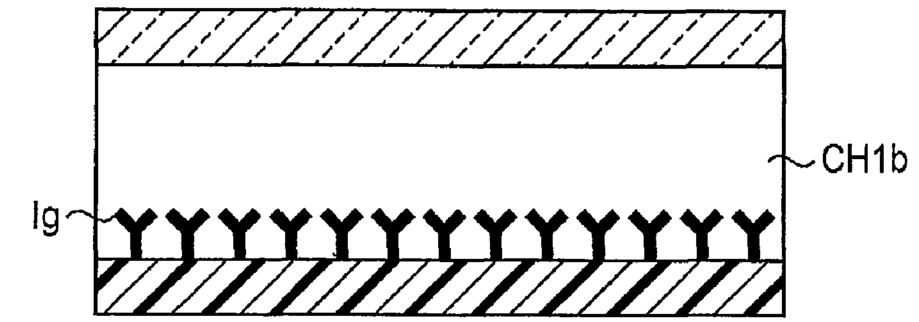
FIGS. 9A to 9C represent schematic views showing antigen-antibody reactions in a reaction portion.
Figure 9B:
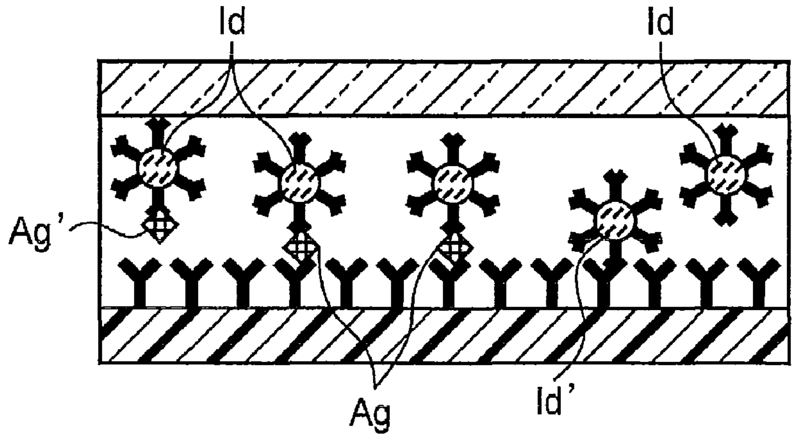
Figure 9C:
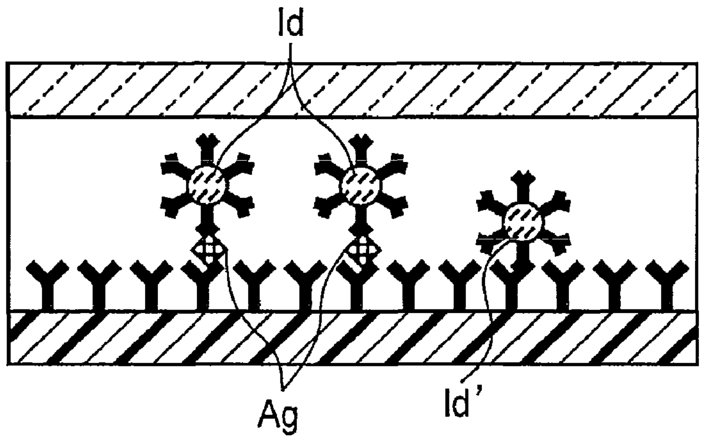

In FIGS. 9A to 9C, an antigen-antibody reaction in the reaction portion is schematically shown. As shown in FIGS. 9A and 9B, when the specimen liquid containing antigens (subject substances of analysis) Ag, to which a fluorescent fine particle (labeled substance) Id is bonded respectively, flows through the narrowed section CH1*b* of the first channel CH1 as the reaction portion, these antigens Ag are adsorbed specifically by the antibodies (probes) Ig that are fixed in the narrowed section CH1*b*. In some cases, a part of antigens Ag' may not be adsorbed by the antibodies Ig fixed in the narrowed section CH1*b* and may be scattered in the specimen liquid. Also, a fluorescent fine particle Id' that is not bonded to the antigen Ag and exists solely is contained in the specimen liquid.

As shown in FIG. 9C, when the washing liquid flows through the narrowed section CH1*b*, the antigens Ag', which are not adsorbed by the antibody Ig and are scattered in the specimen liquid, and the fluorescent fine particle Id, which exists solely in the specimen liquid, are carried off by the specimen liquid or the washing liquid, and then exhausted from the narrowed section CH1*b*. Here, the fluorescent fine particle Id that exists solely in the specimen liquid is adsorbed nonspecifically by the antibody Ig in some cases, and fluorescent fine particles Id' being adsorbed nonspecifically still remain in the narrowed section CH1*b* even after the washing is applied.

The fluorescent fine particles that are present in the narrowed section CH1*b* of the first channel CH1 as the reaction portion are detected and quantitated by the fluorescence detecting unit 15, and then the antigens are detected and quantitated based on that detection and quantification. Since the washing liquid flows through the narrowed section CH1*b* as the reaction portion subsequently to the specimen liquid without intervention of air bubbles, such an event can be suppressed that the fluorescent fine particles that are not bonded to the antigens and exist solely in the specimen liquid are adsorbed nonspecifically in the narrowed section CH1*b* as the reaction portion. Accordingly, accuracy in detecting and quantitating the antigen can be improved.

EXAMPLE

The labeled substances that exist in the reaction portion after the test sequence is applied were detected and quantitated by using the microfluid chip constructed shown in FIG. 1 to FIG. 3.

The microfluid chip was constructed by stacking sequentially the first layer (100×30×1 mm) formed of the polystyrene substrate, the second layer (100×30×0.05 mm) formed of the adhesive double-coated sheet, the third layer (100×30×0.2 mm) formed of the acrylic substrate, the fourth layer (100×30×0.7 mm) formed of the acrylic substrate onto both surface of which the adhesive double-coated sheet is pasted, and the fifth layer (100×30×0.2 mm) formed of the acrylic substrate. As described above, the grooves acting as the first to third channels respectively and the port holes acting as the first to third ports respectively were formed in respective layers by the laser beam machining. The narrowed section of the first channel was formed to have a width of 2 mm and a depth of 0.05 mm, and served as the reaction portion. The second channel connected to the first channel was formed to have a width of 2 mm and a depth of 0.7 mm.

The first to fifth layers prepared as above were stacked in accordance with following procedures.

1) The first layer was rinsed by a distilled water as the pretreatment, then dried, and then underwent the UV ozone treatment.

2) The first layer and the second layer were stacked such that the second layer constitutes the upper layer of the chip.

3) The probes used to adsorb specifically the subject substance of analysis were fixed to the bottom surface portion of the narrowed section of the first channel, which was formed by stacking the first layer and the second layer. Then, the blocking process for suppressing the nonspecific adsorption and the immunostabilizer treatment for keeping an activity of the fixed probes were applied.

4) The blocking treatment was applied to the third to fifth layers respectively.

5) The third to fifth layers were stacked sequentially on the second layer.

The hCG antigen was used as the subject substance of analysis, and the anti-hCG antibody was used as the probe fixed to the reaction portion. As the specimen liquid, the liquid containing the fluorescent fine particles (Yellow Green, ϕ500 nm), which are supporting the anti-hCG antibody and are formed of polystyrene, as the labeled substance was employed. The hCG antigen was not contained in this specimen liquid, and therefore the fluorescent fine particles that exist in the reaction portion of the microfluid chip corresponded to the particles that were adsorbed nonspecifically. In this case, the PBS-T solution was employed as the washing liquid.

In both the case where the reaction was done in accordance with the test sequence, i.e., the case where no bubble is interposed between the specimen liquid and the washing liquid (Example) and the case where the air bubbles are interposed between the specimen liquid and the washing liquid like the conventional approach (Comparative Example), the fluorescent fine particles that were adsorbed nonspecifically in the reaction portion were quantitated. The results are shown in FIG. 10.

Figure 10:
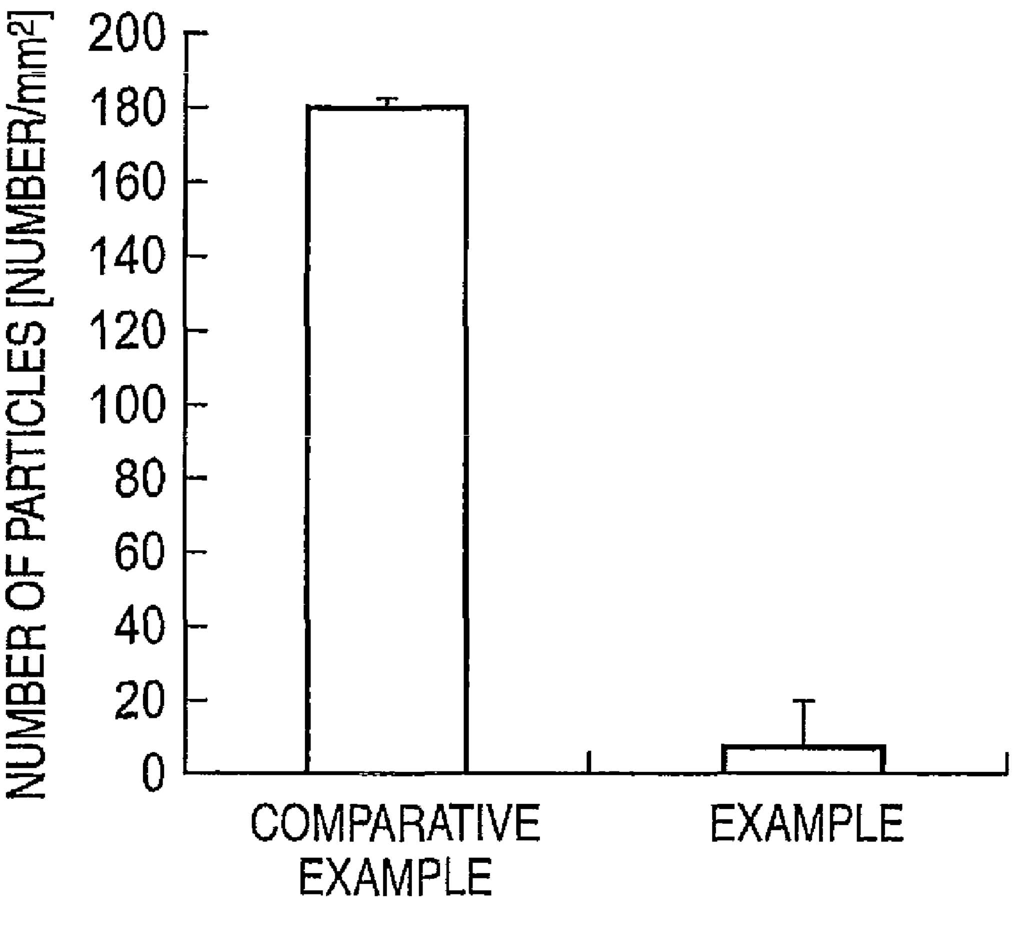
FIG. 10 represents a graph showing quantitated results of fluorescent fine particles in Example and Comparative Example, in which 1 denotes a microfluid chip, 11 denotes a reaction apparatus, 12 denotes a pump (liquid feeding unit), 13 denotes a pressure sensor (pressure measuring unit), 16 denotes a controlling unit, CH1 denotes a first channel, CH1*a* denotes a connection portion connected to a second channel, CH1*b* denotes a narrowed section, CH2 denotes a second channel, CH2*a* denotes a connection portion connected to a first channel, CH3 denotes a third channel, PT1 denotes a first port, PT2 denotes a second port, PT3 denotes a third port, SV1 denotes an electromagnetic valve (liquid feeding unit), SV2 denotes an electromagnetic valve (liquid feeding unit), SV3 denotes an electromagnetic valve (liquid feeding unit) and SV4 denotes an electromagnetic valve (liquid feeding unit).

As shown in FIG. 10, the nonspecific adsorption of the fluorescent fine particles in the case where no bubble is interposed between the specimen liquid and the washing liquid (Example) was reduced to 1/10 or less in the case where the air bubbles are interposed between the specimen liquid and the washing liquid (Comparative Example). As a result, the accuracy in detecting and quantitating the subject substance of analysis can be improved.

With the above, explanation is made in such a situation that the antigen is used as the subject substance of analysis and such antigen is adsorbed specifically by using the antigen-antibody reaction and is detected and quantitated. But the present invention is not limited to this situation. For example, the present invention can be applied to a situation that nucleic acid is used as the subject substance of analysis and such nucleic acid is adsorbed specifically by using the hybridization and is detected and quantitated.

According to the present invention, no bubble is interposed between the specimen liquid and the washing liquid, which are fed sequentially to the first channel in which the adsorption reaction is performed, and therefore not only the liquid feeding is stabilized but also the nonspecific adsorption is suppressed. As a result, a detection/quantitative determination accuracy of the subject substance of analysis can be enhanced.

This application is based on Japanese patent application JP 2008-251875, filed on Sep. 29, 2008, the entire content of which is hereby incorporated by reference, the same as if set forth at length.

What is claimed is:

1. A reaction method of performing an adsorption reaction in which a subject substance of analysis is specifically adsorbed in a wall of a first channel, the method comprising:

flowing a specimen liquid into a second channel that flows said specimen liquid into the first channel which is connected to the second channel so that the specimen liquid is fed to the first channel from the second channel, the specimen liquid containing the subject substance of analysis and a labeled substance that can be bonded to the subject substance of analysis;

stopping feeding of the specimen liquid by detecting an event that an entire specimen liquid flows into the first channel;

feeding a washing liquid after the specimen liquid such that a space is not generated between the two liquids by flowing the washing liquid to a third channel that is made to feed into the first; and feeding the washing liquid to the first channel from the third channel after the washing liquid is joined the specimen liquid, wherein a narrowed section is provided in the first channel, the narrowed section being continued from a connection portion of the first channel to the second channel, a sectional area a of the narrowed section is set smaller than a sectional area A of the second channel, and the event that the entire rear end of the specimen liquid flows into the first channel is detected based on a change in internal pressure of the first channel.

2. The reaction method according to claim 1, wherein the sectional area a of the narrowed section is 2/5 to 1/300 of the sectional area A of the second channel.

3. The reaction method according to claim 1, wherein an opening portion of the connection portion of the first channel connected to the second channel is formed in one surface of the second channel and located in a position that is away from an edge of the surface.

* * * * *